United States Patent
Kalburgi (12)

(10) Patent No.: US 10,742,488 B2
(45) Date of Patent: Aug. 11, 2020

(54) DETECTING LINK FAULTS IN NETWORK PATHS THAT INCLUDE LINK AGGREGATION GROUPS (LAGS)

(71) Applicant: Juniper Networks, Inc., Sunnyvale, CA (US)

(72) Inventor: Surya Prakash S. Kalburgi, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/296,798

(22) Filed: Mar. 8, 2019

(65) Prior Publication Data

US 2019/0207803 A1    Jul. 4, 2019

Related U.S. Application Data

(63) Continuation of application No. 15/641,737, filed on Jul. 5, 2017, now Pat. No. 10,243,781.

(51) Int. Cl.
*H04L 12/28* (2006.01)
*H04L 12/24* (2006.01)
(Continued)

(52) U.S. Cl.
CPC ...... *H04L 41/0654* (2013.01); *H04L 43/0811* (2013.01); *H04L 43/10* (2013.01);
(Continued)

(58) Field of Classification Search
CPC ... H04B 10/0771; H04L 12/24; H04L 12/707; H04L 12/723; H04L 12/741;
(Continued)

(56) References Cited

U.S. PATENT DOCUMENTS 7,561,527 B1    7/2009   Katz et al.
7,664,044 B2    2/2010   Zhai et al.
(Continued)

OTHER PUBLICATIONS

Bhatia et al, Bidirectional Forwarding Detection (BFD) on Link Aggregation Group (LAG) Interfaces, RFC 7130, 11 pages, Feb. 2014.*

(Continued)

*Primary Examiner* — Frank Duong
(74) *Attorney, Agent, or Firm* — Harrity & Harrity, LLP (57) ABSTRACT

A device may receive, from an ingress device, a packet for a protocol session associated with detecting faults in a path of a network that includes a link aggregation group (LAG). The packet may be encapsulated with a user datagram protocol (UDP) header that includes a dynamically assigned UDP source port identifier. The LAG may include a set of links. The device may select, using the dynamically assigned UDP source port identifier, a link in the LAG to use in the path. The device may provide, using the selected link, the packet to one or more downstream devices to permit a downstream device, of the one or more downstream devices, to determine whether packet timeout has occurred. The device may receive an instruction to maintain the protocol session or to close the protocol session and close the path. The device may provide the instruction to the ingress device.

20 Claims, 8 Drawing Sheets

(51) Int. Cl.
*H04L 12/707* (2013.01)
*H04L 12/703* (2013.01)
*H04L 12/26* (2006.01)
*H04L 12/709* (2013.01)
*H04L 12/723* (2013.01)
*H04L 12/741* (2013.01)
*H04L 12/743* (2013.01)

(52) U.S. Cl.
CPC ............ *H04L 45/22* (2013.01); *H04L 45/245* (2013.01); *H04L 45/28* (2013.01); *H04L 45/50* (2013.01); *H04L 45/74* (2013.01); *H04L 45/7453* (2013.01)

(58) Field of Classification Search
CPC . H04L 41/0654; H04L 43/0811; H04L 43/10; H04L 43/50; H04L 45/22; H04L 45/245; H04L 45/28; H04L 45/50; H04L 45/74; H04L 45/7453; H04L 47/10; H04L 47/11; H04L 47/127; H04J 3/14; H04Q 7/34
See application file for complete search history.

(56) References Cited

U.S. PATENT DOCUMENTS

| | | |
|---|---|---|
| 10,243,781 B1 | 3/2019 | Kalburgi |
| 2011/0286324 A1 | 11/2011 | Bellagamba et al. |
| 2013/0070764 A1* | 3/2013 | Boutros ................ H04L 49/351 370/390 |
| 2014/0146664 A1 | 5/2014 | Amante et al. |
| 2015/0195178 A1 | 7/2015 | Bhattacharya et al. |
| 2017/0302547 A1 | 10/2017 | Wang et al. |
| 2019/0058653 A1* | 2/2019 | Mirsky ............... H04L 41/0654 |
| 2019/0089627 A1* | 3/2019 | Mirsky ................ H04L 45/245 |

OTHER PUBLICATIONS

Aggrawal et al., "Bidirectional Forwarding Detection (BFD) for MPLS Label Switched Paths (LSPs)," RFC 5884, Jun. 2010, 12 pages.

Aggrawal R., et al, "OAM Mechanisms in MPLS Layer 2 Transport Networks," IEEE, Oct. 2004, 7 pages.

* cited by examiner

DETECTING LINK FAULTS IN NETWORK PATHS THAT INCLUDE LINK AGGREGATION GROUPS (LAGS)

RELATED APPLICATION

This application is a continuation of U.S. patent application Ser. No. 15/641,737, filed Jul. 5, 2017 (now U.S. Pat. No. 10,243,781), the disclosure of which is incorporated herein by reference.

BACKGROUND

In a label switching network, data packets are forwarded from a traffic ingress node to a traffic egress node based on the labels, rather than using network internet protocol (IP) addresses. A label-switched path (LSP) is a path through a label switching network that forwards data packets based on a header (e.g., a Multi-Protocol Label Switch (MPLS) header) which contains labels. In a label switching network, one or more operation, administration, and management (OAM) protocols may be used to detect link faults or forwarding plane faults within the label switching network.

SUMMARY

According to some possible implementations, a network device may receive, from an ingress network device, a packet for a protocol session associated with detecting faults in a label switched path (LSP) of a label switching network that includes a link aggregation group (LAG). The packet may be encapsulated with a user datagram protocol (UDP) header that includes a dynamically assigned UDP source port identifier. The LAG may include a set of links. The network device may select, using the dynamically assigned UDP source port identifier, a link in the LAG to use as a path in the LSP. The network device may provide, using the selected link, the packet to an egress network device to permit the egress network device to determine whether packet timeout has occurred. The network device may receive, after the egress network device determines whether packet timeout has occurred, an instruction to maintain the protocol session or to close the protocol session. The network device may provide the instruction to the ingress network device.

According to some possible implementations, a system may include a first network device to encapsulate a packet for a protocol session associated with detecting faults in a label switched path (LSP) of a label switching network that includes a link aggregation group (LAG). The encapsulation may include, with the packet, a user datagram protocol (UDP) header that includes a dynamically assigned UDP source port identifier. The system may include a second network device to receive the packet from the first network device. The second network device may select a link in the LAG to use as a path in the LSP. The system may include a third network device to receive the packet from the second network device or to determine that packet timeout has occurred. The third network device may provide, after receiving the packet or determining that packet timeout has occurred, an instruction to the first network device to maintain the protocol session or to close the protocol session.

According to some possible implementations, a method may include receiving, by a network device and from an ingress device, a packet for a protocol session associated with detecting faults in a path of a network that includes a link aggregation group (LAG). The packet may be encapsulated with a user datagram protocol (UDP) header that includes a dynamically assigned UDP source port identifier. The LAG may include a set of links. The method may include selecting, by the network device and by using the dynamically assigned UDP source port identifier, a link in the LAG to use in the path. The method may include providing, by the network device and by using the selected link, the packet to one or more downstream devices to permit a downstream device, of the one or more downstream devices, to determine whether packet timeout has occurred. The method may include receiving, by the network device, after the downstream device determines whether packet timeout has occurred, an instruction to maintain the protocol session or to close the protocol session and close the path. The method may include providing, by the network device, the instruction to the ingress device.

DETAILED DESCRIPTION

The following detailed description of example implementations refers to the accompanying drawings. The same reference numbers in different drawings may identify the same or similar elements.

In a label switching network (e.g., a multiprotocol label switching (MPLS) network), one or more OAM protocols (e.g., a bidirectional forwarding detection (BFD) protocol) may be used to detect link faults or forwarding faults within the label switching network. For example, a BFD protocol may be used on a label switching network to detect issues in a forwarding path from an ingress device to an egress device.

In some cases, network devices in the label switching network may be connected using a link aggregation group (LAG) (e.g., a group of physical links). For example, a first network device may use a LAG to establish one or more connections to a second network device. In this case, the first network device may use a hashing algorithm to select which link in the LAG to use for packet transmission.

However, use of static input values (e.g., an IP address, a user data protocol (UDP) identifier, etc.) for the hashing algorithm may cause packets to always take the same link in the LAG. As a result, a fault detection protocol (e.g., BFD) may not detect a faulty link included in the LAG (e.g., because packets may always take a healthy link in the LAG, when another link in the LAG is faulty). Furthermore, running a fault detection protocol solely on the links associated with the LAG may be insufficient as the fault detection protocol may fail to detect link faults that are internal to the network devices associated with the LAG.

Some implementations described herein include a network device that uses dynamic input values for a hashing algorithm to detect link faults in a LAG. For example, an ingress network device and an egress network device may establish a BFD session associated with detecting faults in a LSP of a label switching network (e.g., an MPLS network) that includes a LAG. In this case, the network device may encapsulate a packet for the BFD session with a UDP header that includes a dynamically assigned UDP source port identifier.

Additionally, the network device may provide the encapsulated packet to a first LAG device (i.e., a device connecting to the LAG at a point of ingress). In this case, the first LAG device may use the dynamically assigned UDP source port identifier with a hashing algorithm to select a link in the LAG to use as a path for the LSP. Furthermore, the network device may use the selected link to provide the encapsulated packet to a second LAG device (i.e., a device connecting to the LAG at a point of egress). If the link is operational, the second LAG device may receive the encapsulated packet, and may provide the encapsulated packet to an egress network device. If the link is not operational, the egress network device may determine that packet loss has occurred, and end the BFD session, which might result in closing the LSP.

By using dynamic input values for a hash algorithm that selects links in a LAG to use as the path for the LSP, packets are able to travel through all (or some) of the links in the LAG, thereby allowing all (or some) of the links to be tested using BFD. Furthermore, after detecting a link fault, the network device may close the LSP, thereby improving overall network performance by reducing packet loss. Moreover, preventing packet loss conserves processing resources that might otherwise be spent re-sending packets and/or implementing error correction techniques.

FIGS. 1A-1D are diagrams of an overview of an example implementation 100 described herein. Example implementation 100 shows traffic flow of packets through a LSP of a label switching network (e.g., an MPLS network) that has BFD enabled. In this case, assume that peer device A communicates with peer device B by establishing a LSP through the label switching network. The LSP may extend from label edge router (LER) A, to label switched router (LSR) A, to LSR B, to LER B, where LSR A and LSR B are connected using a LAG.

Figure 1A:
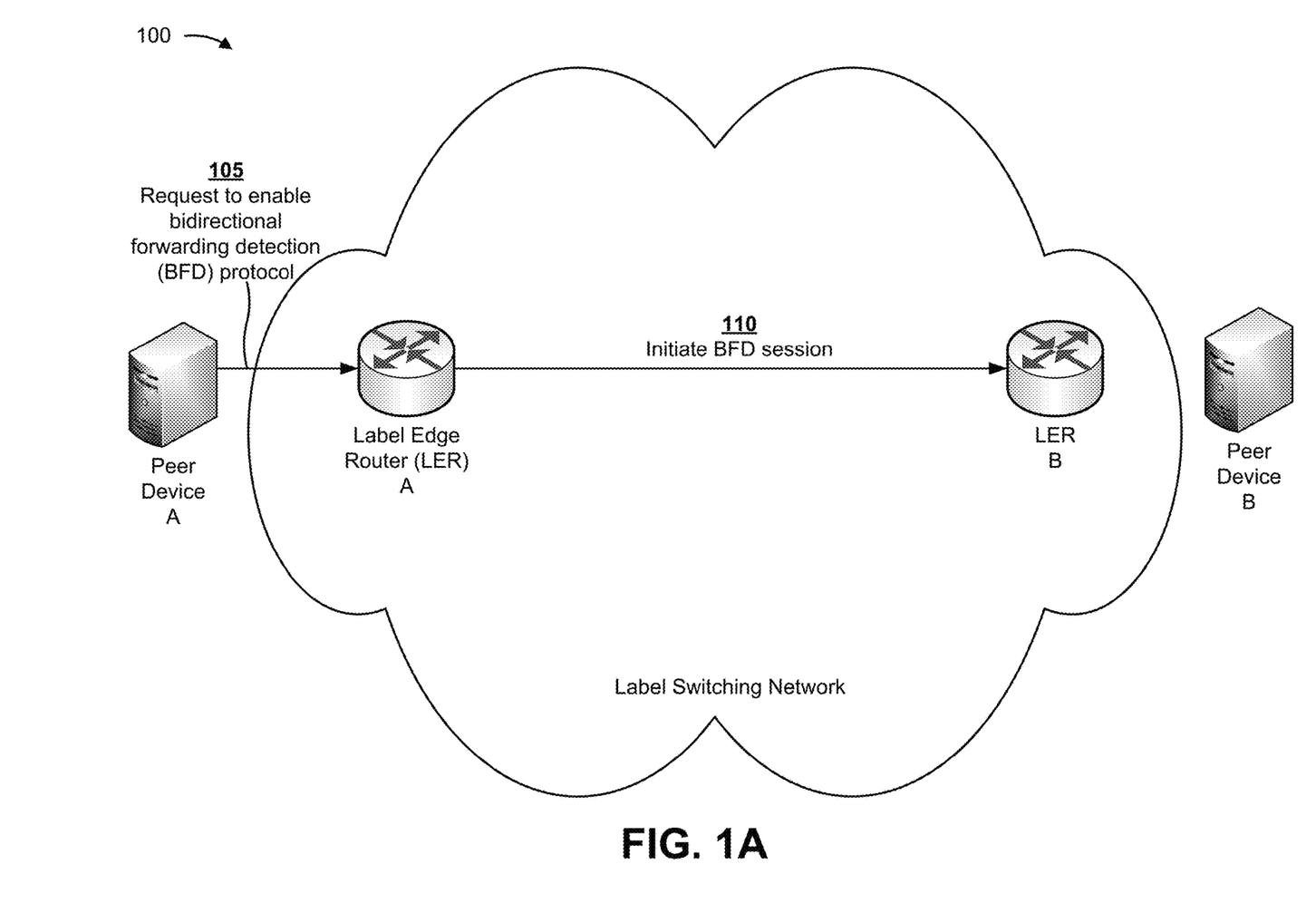
FIGS. 1A-1D are diagrams of an overview of an example implementation described herein.

As shown in FIG. 1A, and by reference number 105, LER A may receive, from peer device A, a request to enable a BFD protocol. For example, a user may access peer device A to request that a BFD protocol be enabled on the LSP to determine whether one or more links in the LSP are faulty.

As shown by reference number 110, LER A may initiate a BFD session with LER B. For example, LER A and LER B may initiate a BFD session by negotiating a set of BFD session values. A BFD session may involve periodically sending encapsulated packets over the LSP to determine whether one or more links in the LSP are faulty. The BFD session values may include one or more sender discriminator values and one or more receiver discriminator values, a BFD session identifier, a transmission interval value, a minimum receiver-side speed value (e.g., a limit on a speed at which a receiving device can process packets), a transmission multiplier value (e.g., used in determining a time until packet timeout occurs, as described further herein), or the like. The discriminator values may be unique to each BFD session, and may allow LER B to determine which BFD session a packet belongs to without needing a UDP source port identifier.

In this way, LER A and LER B are able to initiate a BFD session that may be used to test one or more links in the LSP, as described herein.

Figure 1B:
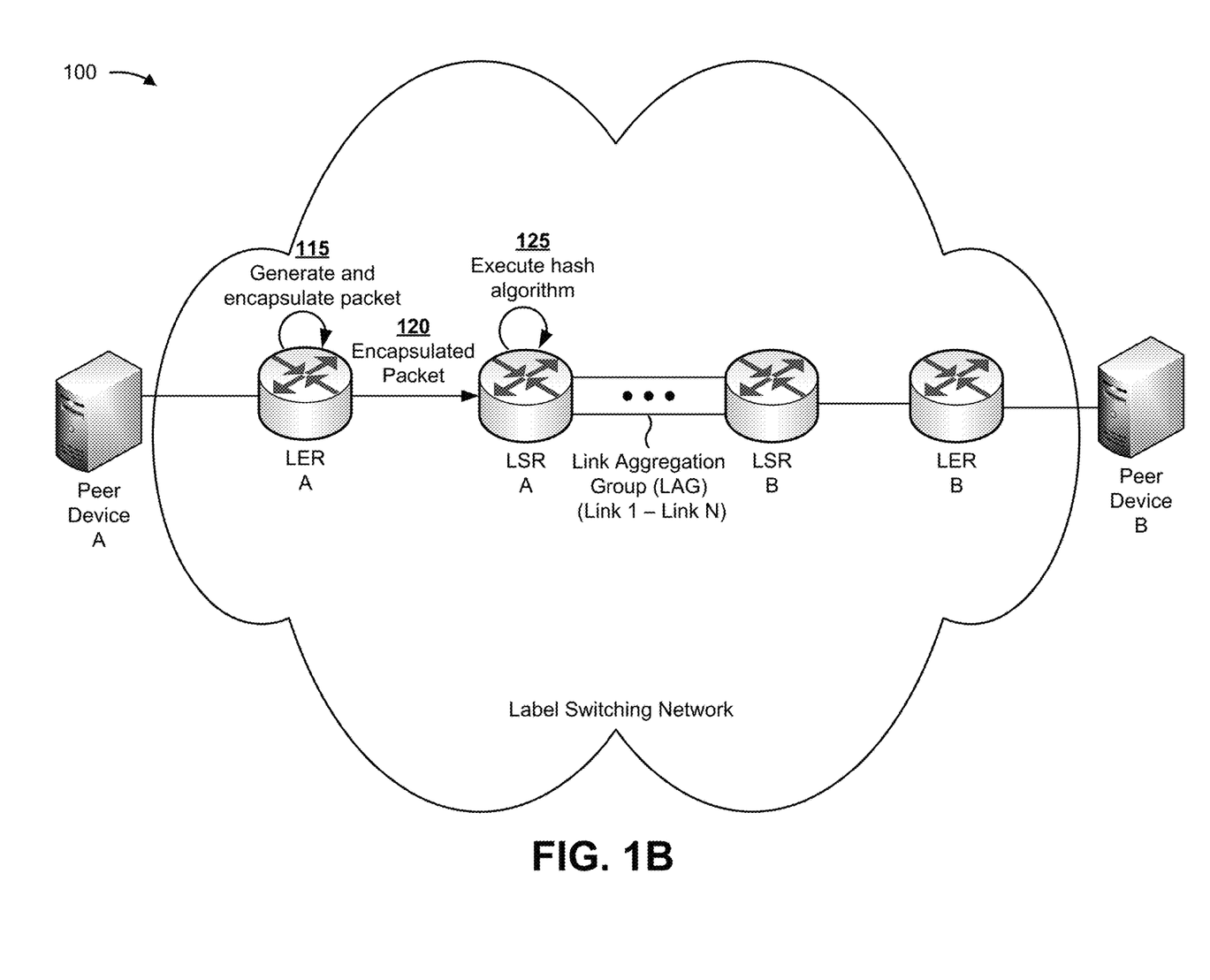

As shown in FIG. 1B, and by reference number 115, LER A may generate and encapsulate a packet. For example, LER A may generate a packet as part of the BFD session. In this case, LER A may encapsulate the packet with an internet protocol (IP) header and a user datagram protocol (UDP) header. The IP header may include a source IP address and a destination IP address. The UDP header may include a dynamically assigned UDP source port identifier and a UDP destination port identifier. In this case, LER A may have dynamically assigned a UDP source port identifier from a set of port identifiers (e.g., a reserved internet assigned numbers authority (IANA) pool). Additionally, LER A may be configured to modify the dynamically assigned UDP source port identifier after a set time interval, as described further herein.

As shown by reference number 120, LER A may provide the encapsulated packet to LSR A. As shown by reference number 125, LSR A may execute a hash algorithm. For example, LSR A may execute a hash algorithm to identify a link in the LAG. In this case, the hash algorithm may use the dynamically assigned UDP source port identifier to compute a hash key, which may allow LSR A to use the hash key to select a link in the LAG. By using a dynamically assigned UDP source port identifier (instead of a static UDP source port identifier), LSR A may select different links in the LAG during the BFD session (whereas using a static UDP source port identifier with a hash algorithm may always select the same link in the LAG).

By using a dynamic value when executing the hash algorithm, LSR A is able to use the hash algorithm to test all (or some) of the links in the LAG.

Figure 1C:
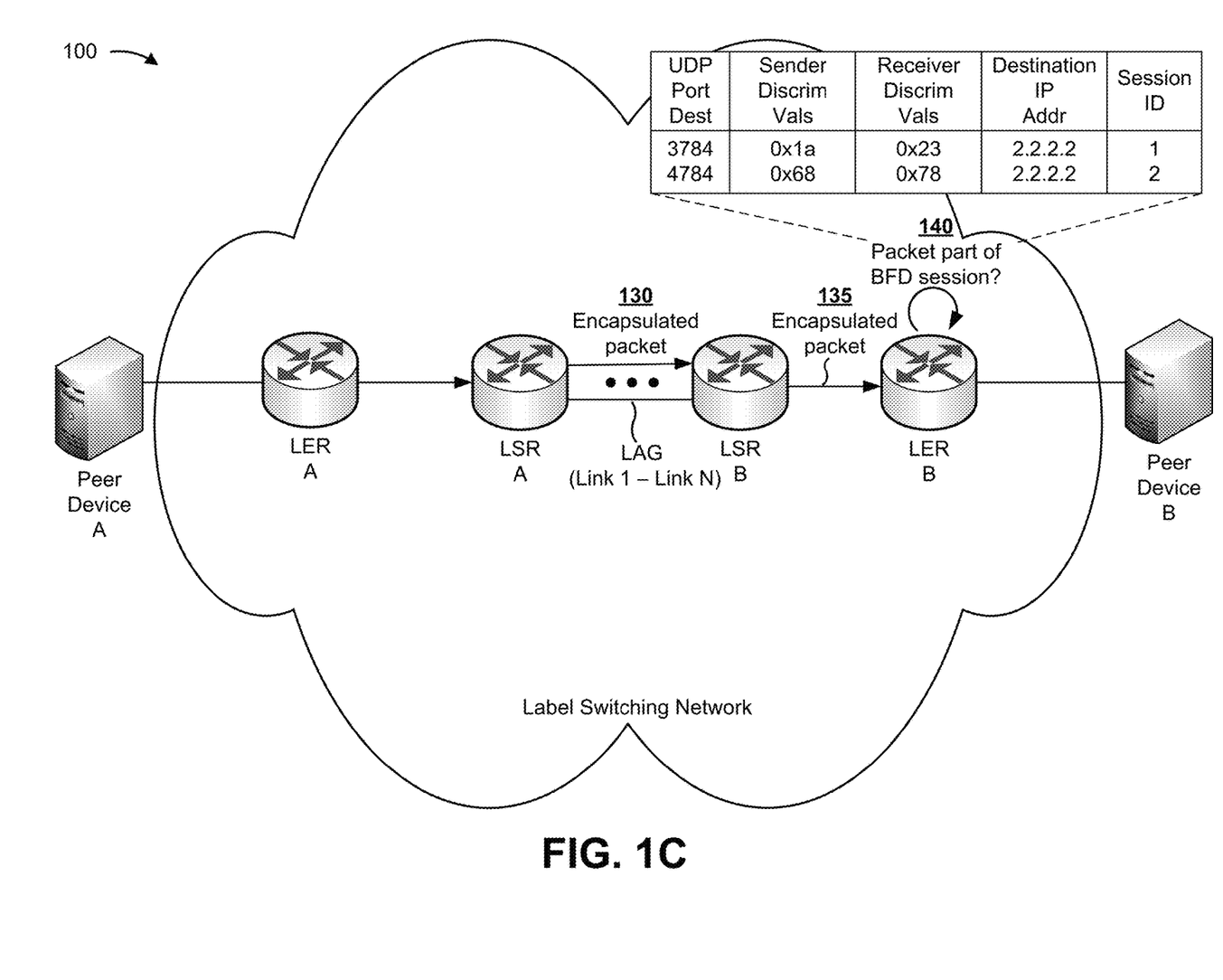

As shown in FIG. 1C, and by reference number 130, LSR A may provide the encapsulated packet to LSR B. For example, LSR A may provide the encapsulated packet to LSR B using the selected link of the LAG. In this case, LSR B may successfully receive the encapsulated packet, and, as shown by reference number 135, may provide the encapsulated packet to LER B.

As shown by reference number 140, LER B may determine whether the encapsulated packet is part of the BFD session. For example, LER B may compare one or more values included in headers that were encapsulated with the packet and one or more values included in a BFD session data structure. LER B may store BFD session values that were determined when the BFD session was initiated. In this case, LER B may compare one or more values included in the headers that were encapsulated with the packet (e.g., the UDP destination port identifier, the sender discriminator value, the receiver discriminator value, the destination IP address, etc.) and one or more values stored in the session data structure (e.g., a set of UDP destination port identifiers, a set of sender discriminator values, a set of receiver discriminator values, a set of destination IP addresses, etc.) to identify the BFD session to which the encapsulated packet belongs.

In this way, LER B is able to identify a BFD session to which the encapsulated packet belongs without using the dynamic UDP source port identifier.

Figure 1D:
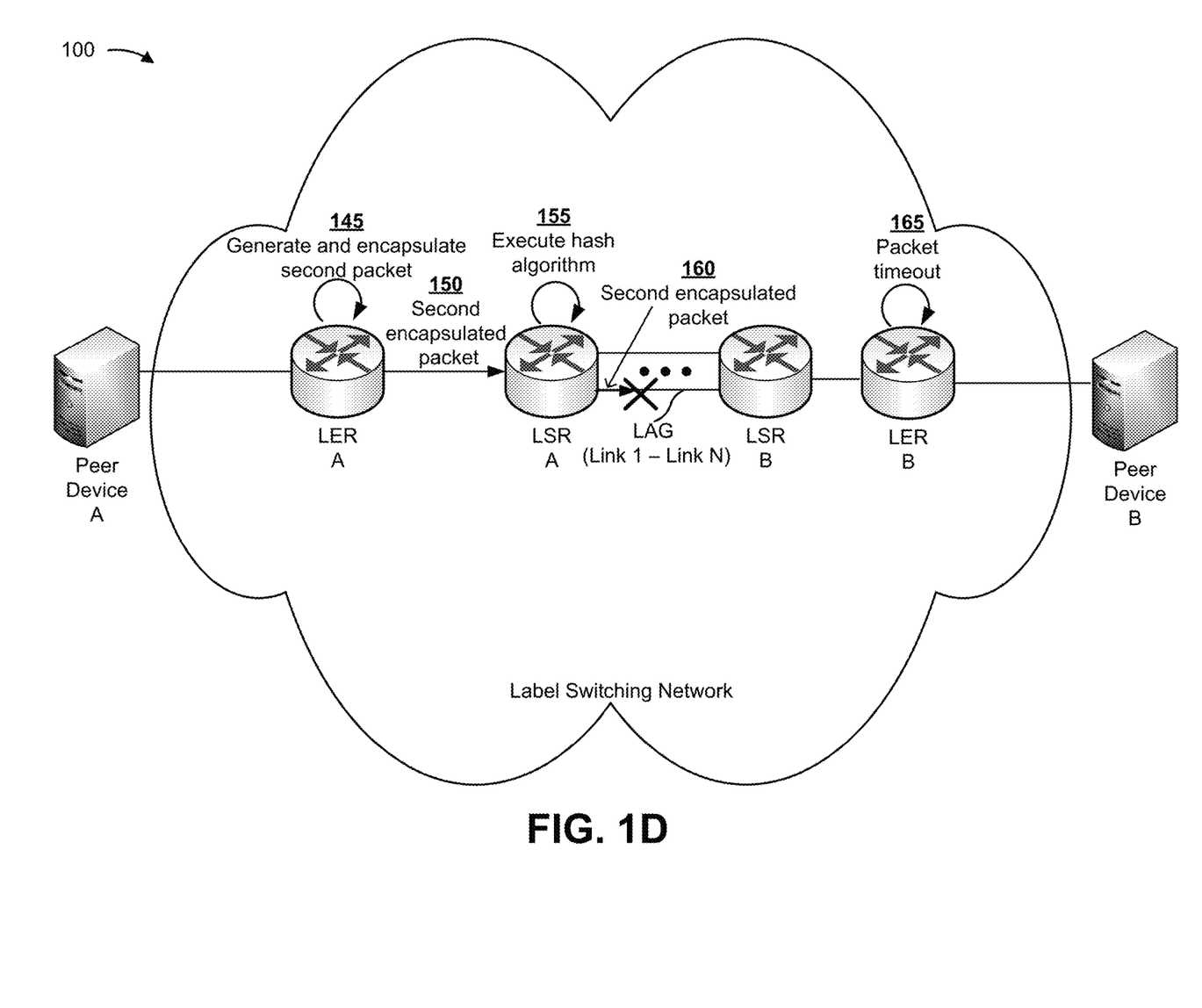

As shown in FIG. 1D, and by reference number 145, LER A may generate and encapsulate a second packet, in the same manner described above. In this case, the second packet may be encapsulated with a UDP header that includes a new dynamically assigned UDP source port identifier. As shown by reference number 150, LER A may provide the second encapsulated packet to LSR A.

As shown by reference number 155, LSR A may execute the hash algorithm using the new dynamically assigned UDP source port identifier. In this case, the hash algorithm may be used to select a link in the LAG. The selected link may be different than the link selected in association with the previous encapsulated packet as a result of using the hash algorithm with the new dynamically assigned UDP source port identifier.

As shown by reference number 160, the second encapsulated packet may not reach LSR B (e.g., as a result of link failure of the selected link). In this case, and as shown by reference number 165, LER B may determine that packet timeout has occurred. For example, LER B may determine that packet timeout has occurred based on whether the encapsulated packet is received within a maximum transmission time interval.

In some cases, LER B may determine the maximum transmission time interval. For example, LER B may set a start time to the maximum transmission time interval to a time when a previous packet is scheduled to be received (or initially, when the BFD session is initiated). In this case, LER B may determine an end time for the maximum transmission time interval by multiplying the transmission interval value by the transmission multiplier value. As shown, LER B may determine that packet timeout has occurred because the second encapsulated packet is not received within the maximum transmission time interval.

Additionally, if LER B determines that packet timeout has occurred, then LER B or LER A would terminate the BFD session and may close the MPLS LSP. For example, LER A may close the LSP in response to BFD down event to prevent traffic flow from using the faulty path. In this case, LER A may provide a request to a device associated with an interested party to repair the link or to replace the link (e.g., by repairing or replacing a board associated with the link, by repairing or replacing the link itself, etc.). In this way, LER A improves network performance by preventing traffic flow over the faulty link, and conserves network resources that might otherwise be used to re-send packets (e.g., a packet that may be dropped by the faulty link) and/or implement error correction techniques.

As an example overview, LER A may dynamically update the UDP source port identifier each time LER A transmits a packet to LSR A. In this case, LSR A may use a hash algorithm to select a different link in the LAG during each packet transmission (e.g., as a result of LER A dynamically updating the UDP source port identifier). In this way, all of the links in the LAG can be tested using BFD.

By using dynamically assigned UDP source port identifiers as input for a hash algorithm that selects links in a LAG for testing, network devices (e.g., LER A, LSR A, LSR B, LER B, etc.) may use BFD to detect all (or some) link faults in the LAG.

As indicated above, FIGS. 1A-1D are provided merely as an example. Other examples are possible and may differ from what was described with regard to FIGS. 1A-1D. For example, while implementations described herein focus on BFD in LSPs of an MPLS network, other implementations may utilize other OAM protocols, other paths, other types of networks, or the like.

Figure 2:
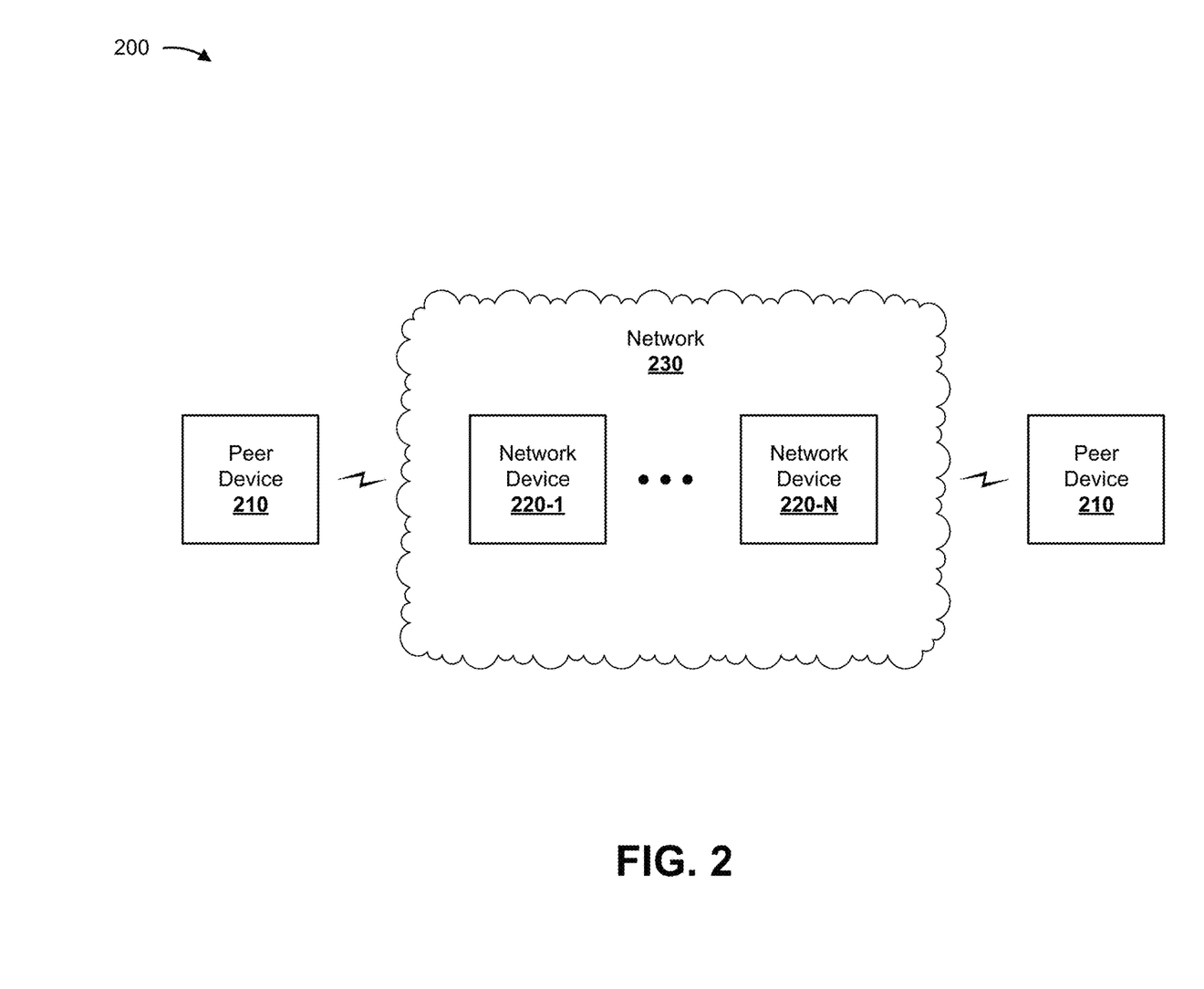
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more peer devices 210, one or more network devices 220-1 through 220-N(N≥1) (hereinafter referred to collectively as "network devices 220," and individually as "network device 220"), and a network 230. Devices of environment 200 may interconnect via wired connections, wireless connections, or a combination of wired and wireless connections.

Peer device 210 includes one or more devices capable of receiving and/or providing network traffic. For example, peer device 240 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. Additionally, or alternatively, peer device 210 may include an endpoint device that is a source or a destination for network traffic. For example, peer device 210 may include a computer or a similar type of device. Peer device 210 may receive network traffic from and/or may provide network traffic to other peer devices 210 via network 230 (e.g., by routing packets using network device(s) 220 as an intermediary).

Network device 220 includes one or more devices (e.g., one or more traffic transfer devices) capable of processing, forwarding, and/or transferring traffic between peer devices (e.g., peer devices 210) and/or routing devices (e.g., other network devices 220). For example, network device 220 may include a router (e.g., a label switching router (LSR), a label edge router (LER), an ingress router, an egress router, a provider router, etc.), a gateway, a switch, a firewall, a hub, a bridge, a reverse proxy, a server (e.g., a proxy server), a security device, an intrusion detection device, a load balancer, or any traffic transfer device that uses label switching to forward packets. In some implementations, network device 220 may be a physical device implemented within a housing, such as a chassis. In some implementations, network device 220 may be a virtual device implemented by one or more computer devices of a cloud computing environment or a data center.

In some implementations, a first network device 220 (e.g., an ingress LER) may encapsulate a BFD packet with an MPLS header, an IP header, and/or a UDP header. In some implementations, the first network device 220 may provide the encapsulated BFD packet to a second network device 220 (e.g., a LSR associated with a LAG). In this case, the second network device 220 may provide the encapsulated BFD packet to a third network device 220 (e.g., another LSR associated with the LAG), using a dynamic hash algorithm. In some implementations, the third network device 220 may provide the encapsulated packet to a fourth network device 220 (e.g., an egress LER).

Network 230 includes one or more wired and/or wireless networks. For example, network 230 may include an MPLS network. Additionally, or alternatively, network 230 may include a cellular network (e.g., a code division multiple access (CDMA) network, a third generation (3G) network, a fourth generation (4G) network, such as a long-term evolution (LTE) network, a fifth generation (5G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some implementations, network 230 may include a label switching (e.g., MPLS) network. A label switching network is a network that provides efficient packet forwarding by applying labels to packets (e.g., a value stored in the header of the packets). The labels are added at the ingress of the label switching network and are removed at the egress of the label switching network. Label-based encapsulation techniques are less computationally expensive than routing based on IP addresses because the labels are shorter than IP addresses and may be located faster when querying a routing or forwarding table.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
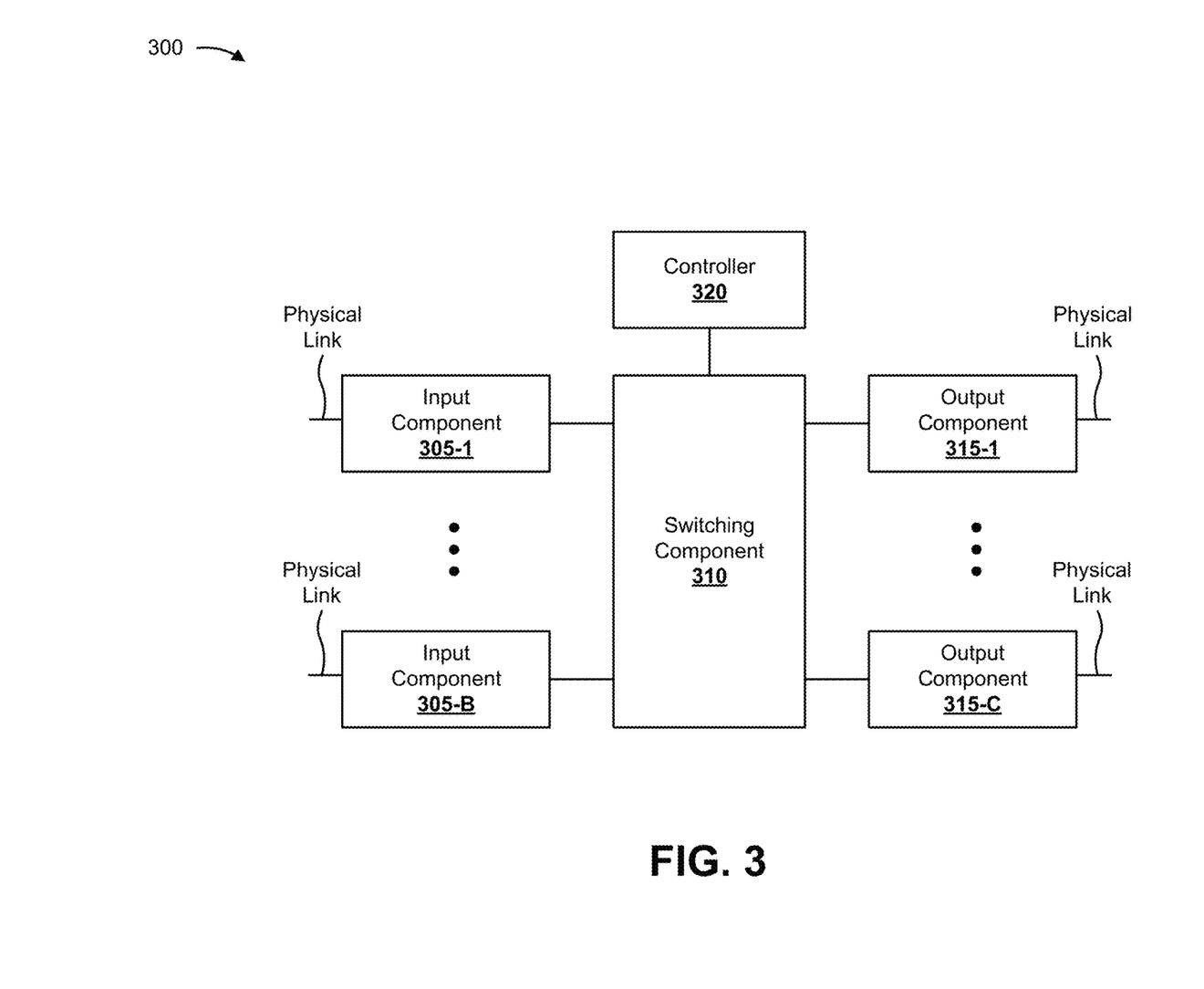
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of software and hardware. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection (e.g., BFD) session, and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
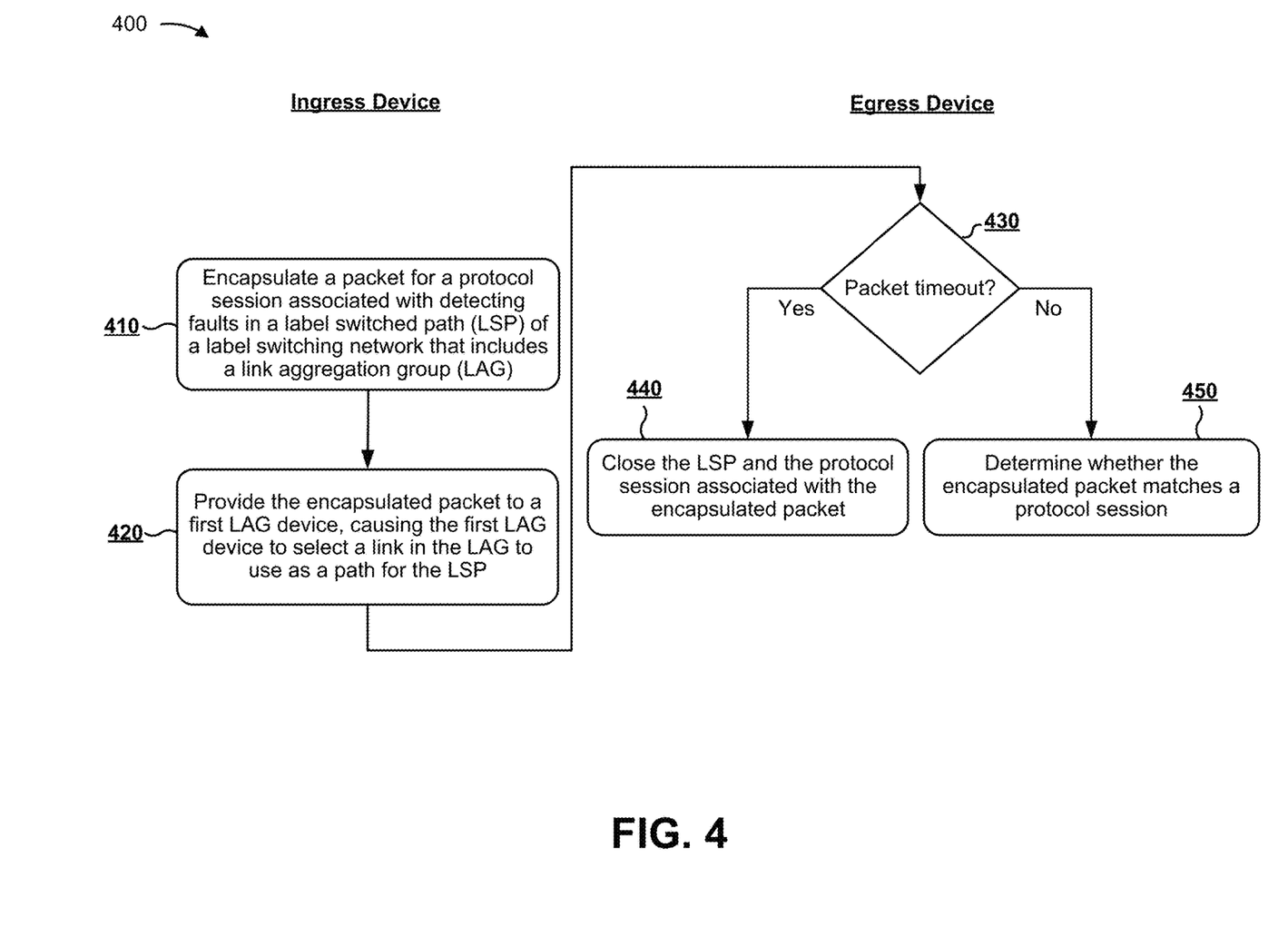
FIG. 4 is a flow chart of an example process for detecting link faults in network paths that include a LAG.

FIG. 4 is a diagram of an example process for detecting link faults in network paths that include a LAG. In some implementations, one or more process blocks of FIG. 4 may be performed by ingress network device 220. In some implementations, one or more process blocks of FIG. 4 may be performed by another device or a group of devices separate from or including ingress network device 220, such as peer devices 210, a first LAG device, a second LAG device, and/or egress network device 220.

As shown in FIG. 4, process 400 may include encapsulating a packet for a protocol session associated with detecting faults in a label switched path (LSP) of a label switching network that includes a link aggregation group (LAG) (block 410). For example, ingress network device 220 (e.g., a label edge router (LER), a provider edge (PE) router, etc.) may encapsulate a packet for a protocol session (e.g., a bidirectional forwarding detection (BFD) session) associated with detecting faults in a LSP of a label switching network (e.g., a multiprotocol label switching (MPLS) network) that includes a LAG. A LAG may be a set of physical links between two network devices (e.g., two label switching routers (LSRs), two provider (P) routers, etc.) that are included in the LSP. In this case, the packet may be encapsulated with a label switching header (e.g., an MPLS header), an internet protocol (IP) header, and a user datagram protocol (UDP) header, where the UDP header may include a dynamically updated UDP source port identifier, as described further herein.

In some implementations, ingress network device 220 may establish a LSP between network devices included in the label switching network (e.g., the MPLS network). For example, an encapsulation technique (e.g., MPLS) may be used to provide a LSP from ingress network device 220 (e.g., a device located at an edge of the MPLS network) to egress network device 220 (e.g., a device located at another edge of the MPLS network), using one or more additional network devices 220 as intermediaries. In this case, the encapsulation technique may be used to establish a LSP such that packets entering the label switching network are encapsulated with an incoming label and sent to one or more downstream devices. Additionally, the one or more downstream devices may receive the encapsulated packet, perform a routing table lookup, and determine an outgoing label and a next hop.

In some implementations, ingress network device 220 may receive, from peer device 210, a request to enable a BFD protocol on the LSP. For example, peer device 210 may request that a BFD protocol be enabled on the LSP to determine whether one or more links in the LSP are faulty. A BFD session may be used to implement the BFD protocol, and may involve periodically sending encapsulated packets over the LSP to test link faults.

In some implementations, ingress network device 220 may enable the LSP to support BFD. In this case, ingress network device 220 may initiate a BFD session with egress network device 220 by performing a three-way handshake. During the handshake, ingress network device 220 and an egress network device 220 may negotiate a set of protocol session values (e.g., BFD session values). BFD session values may include one or more sender discriminator values (e.g., one for each UDP destination port identifier), one or more receiver discriminator values (e.g., one for each UDP destination port identifier), a BFD session identifier, a transmission interval value (e.g., indicating how often to send packets), a minimum receiver-side speed value (e.g., a limit on a speed at which a receiving device can process packets), a transmission multiplier value (e.g., used in determining a time until packet timeout occurs, as described further herein), or the like. The one or more discriminator values may be unique to each BFD session, and may allow egress network device 220 to determine to which BFD session an encapsulated packet belongs. Furthermore, ingress network device 220 may encapsulate the packet with the set of BFD session values to allow egress network device 220 to reference the set of BFD session values upon receiving the packet.

In some implementations, ingress network device 220 may encapsulate the packet with an IP header. For example, ingress network device 220 may encapsulate packet with an IP header that includes a source IP address (e.g., an IP address of ingress network device 220, etc.) and a destination IP address (e.g., a fixed destination IP address, such as 127.0.0.1).

In some implementations, ingress network device 220 may encapsulate the packet with a UDP header. For example, ingress network device 220 may encapsulate the packet with a UDP header that includes a UDP source port identifier and a UDP destination port identifier. In this case, ingress network device 220 may use a dynamically assigned UDP source port identifier (e.g., a UDP source port identifier between 49,152 and 65,535) and may use a static UDP destination port identifier (e.g., 3784 for single hop and 4784 for multi hop). To dynamically assign a UDP source port identifier, ingress network device 220 may randomly select a UDP source port identifier from a set of port identifiers (e.g., a reserved internet assigned numbers authority (IANA) pool).

In some implementations, ingress network device 220 can be configured to dynamically reassign a new UDP source port identifier after a set interval. For example, ingress network device 220 may dynamically reassign a new UDP source port identifier using an interval that is aligned with the transmission interval of the BFD (e.g., such that packets in a BFD session have a unique UDP source port identifier for every such interval).

By encapsulating the packet with a dynamically assigned UDP source port identifier, ingress network device 220 allows one or more downstream network devices to determine if all (or some) of the links in the LAG are operational, as described further herein.

As shown in FIG. 4, process 400 may include providing the encapsulated packet to a first LAG device, causing the first LAG device to select a link in the LAG to use as a path for the LSP (block 420). For example, ingress network device 220 may provide the encapsulated packet to a first LAG device, such as a label switching router (LSR), a provider (P) router, or the like. In this case, the first LAG device may serve as a point of ingress for the LAG, and the LAG may connect to a second LAG device that serves as a point of egress for the LAG. Furthermore, after receiving the encapsulated packet, the first LAG device may execute a hash algorithm to select a link in the LAG to use as the path for the LSP.

In some implementations, ingress network device 220 may provide the encapsulated packet to the first LAG device. For example, ingress network device 220 may use the incoming label in the label switching header to perform a routing table lookup. The routing table lookup may identify an outgoing label and a next hop. In this case, the next hop may identify the first LAG device, which may cause ingress network device 220 to provide the encapsulated packet to the first LAG device.

In some implementations, the first LAG device may execute a hash algorithm to select a link in the LAG to use as the path for the LSP. For example, assume the LAG includes a set of links (e.g., 10 links, 25 links, 50 links. etc.). In this case, the first LAG device may execute a hash algorithm that uses the dynamically assigned UDP source port identifier to compute a hash key, which may be indexed to a particular link included in the LAG.

In some implementations, the first LAG device may provide the encapsulated packet to the second LAG device. For example, the first LAG device may provide the encapsulated packet to the second LAG device by using a link of the LAG that is selected by the hash algorithm.

In some implementations, the first LAG device may periodically receive additional encapsulated packets throughout the duration of the BFD session until all (or some) of the links in the LAG are tested. For example, assume a first packet is encapsulated and provided to the first LAG device, and that after a set amount of time passes, a second packet is encapsulated and provided to the first LAG device. Further assume that the first encapsulated packet has a different UDP source port identifier than the second encapsulated packet. In this case, the first packet and the second packet may be hashed to different links of the LAG as a result of having different UDP source port identifiers. In this way, dynamically assigned UDP source port identifiers allow the first LAG device to provide packets using all (or some) of the links in the LAG.

By providing the encapsulated packet with the dynamically assigned UDP source port identifier to the first LAG device, the first LAG device is able to use a hash algorithm to select a link of the LAG.

As shown in FIG. 4, process 400 may include determining whether packet timeout has occurred based on whether the encapsulated packet is received within a maximum transmission time interval (block 430). For example, egress network device 220 (e.g., a LER device, a PE device, etc.) may determine whether packet timeout has occurred by receiving the encapsulated packet within a maximum transmission time interval, by not receiving the encapsulated packet, or by receiving the encapsulated packet after the maximum transmission time interval. In some cases, a maximum transmission time interval may be calculated using values negotiated during the initialization of the BFD session (e.g., the transmission interval, the transmission multiplier, etc.). In this way, egress network device 220 is able to determine whether the link used to provide the encapsulated packet is operational (e.g., because an operational link would provide the encapsulated packet to egress network device 220 within the maximum transmission time interval).

In some implementations, egress network device 220 may determine the maximum transmission time interval. For example, when the BFD session is initiated, assume ingress network device 220 and egress network device 220 negotiate a set of BFD session values that include a transmission interval and/or a transmission multiplier. Further assume that egress network device 220 uses a time stamp indicating the start of the BFD session as the start of the maximum transmission time interval. In this case, egress network device 220 may determine the end of the maximum transmission time interval by multiplying the transmission interval value by the transmission multiplier value. If the encapsulated packet is not received before the end of the maximum transmission interval time, then packet timeout occurs. If the encapsulated packet is received before the end of the maximum transmission interval time, then packet timeout does not occur.

In some implementations, egress network device 220 may determine whether a link used to provide the encapsulated packet is operational based on whether the encapsulated packet is received within the maximum transmission time interval. For example, if the link in the LAG that is used to provide the encapsulated packet is operational and functioning properly, then one or more downstream devices may provide the encapsulated packet to egress network device 220 within the maximum transmission time interval. If the link used to provide the encapsulated packet is not operational, or is operational but not functioning properly (e.g., packets sent through the link experience delay), then egress network device 220 may not receive the encapsulated packet within the maximum transmission time interval.

If packet timeout has occurred (block 430—YES), then process 400 may include closing the LSP and the protocol session associated with the encapsulated packet (block 440). For example, egress network device 220 may interact with ingress network device 220 to close the LSP and the BFD session.

In some implementations, ingress network device 220 may close the LSP. For example, egress network device 220 may determine that packet timeout has occurred, and may provide an indication of the timeout to ingress network device 220. In this case, ingress network device 220 may close the LSP to prevent subsequent packets from using the LSP.

In some implementations, ingress network device 220 and egress network device 220 may close the BFD session. For example, egress network device 220 may determine that packet timeout has occurred, and may interact with ingress network device 220 (e.g., by performing another three-way handshake) to close the BFD session.

In some implementations, ingress network device 220 or egress network device 220 may close the link. For example, ingress network device 220 or egress network device 220 may provide an instruction to the first LAG device and/or the second LAG device to close the link. By closing the link, the hash algorithm executed by the first LAG device may be unable to select the link, thereby preventing additional LSPs from using the link in the LAG that is not operational.

In some implementations, ingress network device 220 or egress network device 220 may provide a recommendation to repair or replace the link. For example, egress network device 220 may generate a recommendation to repair or replace the link, and may provide the recommendation to a device associated with an interested party (e.g., a device accessible by a technical support team).

By closing the LSP, the BFD session, and/or the faulty link, traffic flow may be redirected to other LSPs (or other links in the LAG), thereby reducing packet loss and improving network performance.

If packet timeout has not occurred (block 430—NO), then process 400 may include determining whether the encapsulated packet matches a protocol session (block 450). For example, egress network device 220 may determine whether the encapsulated packet matches a BFD session by comparing values stored in the headers encapsulated with the packet and a session data structure that stores values associated with a set of BFD sessions.

In some implementations, egress network device 220 may determine whether the encapsulated packet matches a BFD session. For example, egress network device 220 may store BFD session values for a set of BFD sessions, and may determine whether the encapsulated packet matches a BFD session by comparing values stored in the headers encapsulated with the packet and the BFD session values stored using the session data structure. The encapsulated packet may include the source IP address, the destination IP address, the UDP destination port identifier, the sender discriminator value, and the receiver discriminator value. The session data structure may include a set of source IP addresses, a set of destination IP addresses, a set of UDP destination port identifiers, a set of sender discriminator values, and a set of receiver discriminator values. In this case, egress network device 220 may compare the values included in the encapsulated packet and the values included in the session data structure to determine a session to which the encapsulated packet belongs.

In some cases, egress network device 220 may determine whether the encapsulated packet matches a BFD session by performing a set of session data structure queries. For example, egress network device 220 may perform a first query to determine whether the destination IP address of the encapsulated packet matches the IP address of egress network device 220. In this case, egress network device 220 may compare the destination IP address stored in the IP header and an IP address of egress network device 220.

If the destination IP address stored in the IP header does not match with the IP address of egress network device 220, then egress network device 220 may discard the encapsulated packet. If the destination IP address stored in the IP header matches the IP address of egress network device 220, then egress network device 220 may determine whether the UDP destination port identifier included in the encapsulated packet is associated with a single hop or with a double hop (e.g., UDP destination port identifier 3784 may be associated with a single hop and UDP destination port identifier 4784 may be associated with a multi hop). If the UDP destination port identifier is not associated with a single hop or with a multi hop, then egress network device 220 may discard the encapsulated packet.

If the UDP destination port identifier is associated with a single hop or a multi hop, then egress network device 220 may search the session data structure to determine whether discriminator values included in the encapsulated packet match discriminator values included in the session data structure. If the discriminator values included in the encapsulated packet do not match the discriminator values included in the session data structure, then egress network device 220 may discard the encapsulated packet. If the discriminator values included in the encapsulated packet match one or more discriminator values included in the session data structure, then egress network device 220 may accept the encapsulated packet.

Additionally, egress network device 220 may provide packets to ingress network device 220. For example, egress network device 220 may encapsulate and provide packets to ingress network device 220 in the same manner described above. In this case, egress network device 220 may serve as a point of ingress for the encapsulated packet and ingress network device 220 may serve as a point of egress for the encapsulated packet.

In this way, egress network device 220 is able to perform session matching without use of a UDP source port identifier, thereby enabling ingress network device 220 to dynamically update the UDP source port identifier without consequence to the BFD testing.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using dynamic input values for a hash algorithm that selects links in a LAG to use as the path for the LSP, packets are able to travel through all (or some) of the links in the LAG, thereby allowing the links in the LAG to be tested using BFD. Furthermore, after detecting a link fault, ingress network device 220 or egress network device 220 may close the LSP, thereby improving overall network performance by reducing packet loss. Moreover, preventing packet loss conserves processing resources that might otherwise be spent re-sending packets and/or implementing error correction techniques.

Figure 5:
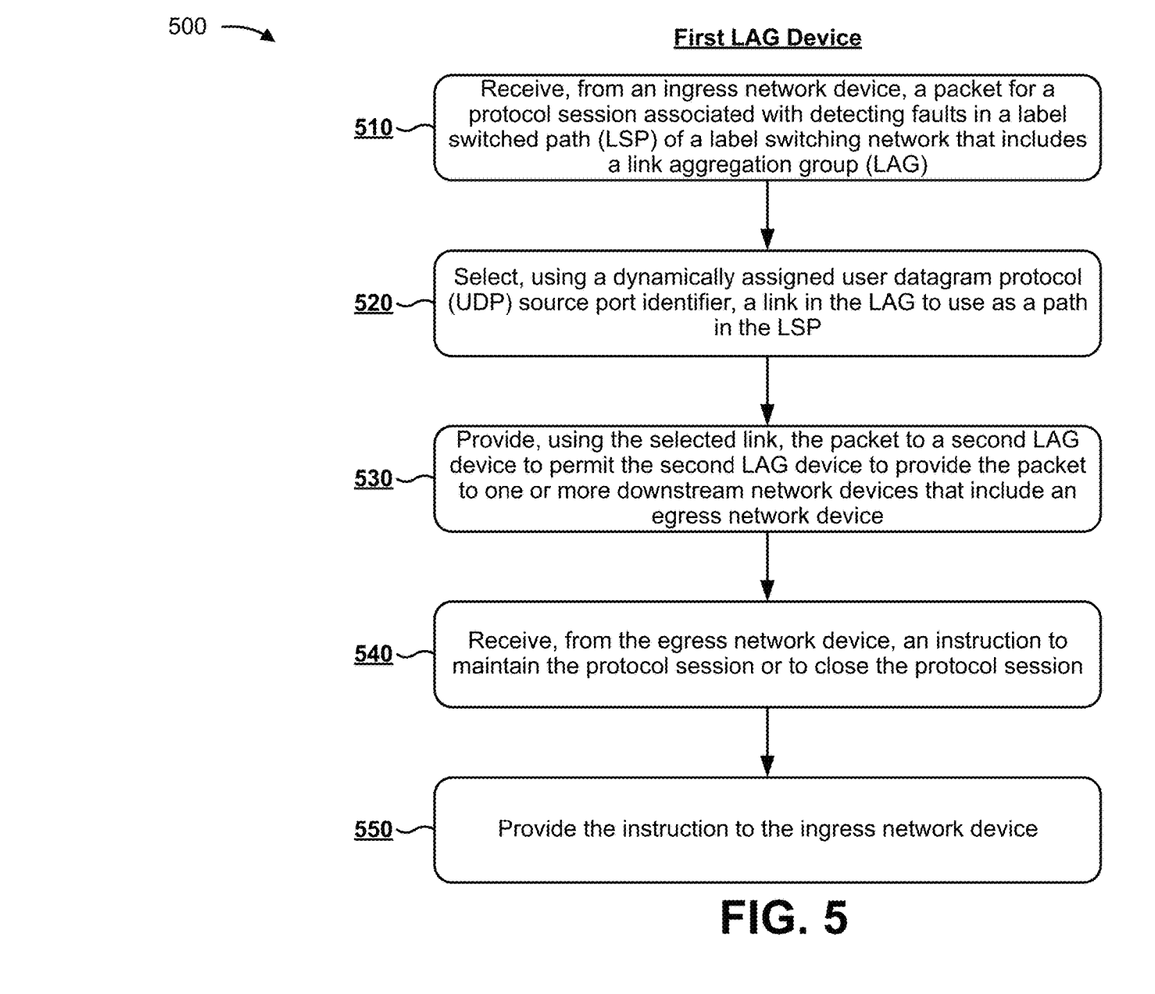
FIG. 5 is a flow chart of the example process shown in FIG. 4 through the perspective of a device connected to the LAG.

FIG. 5 is a flow chart of the example process shown in FIG. 4 through the perspective of a device connected to the LAG. In some implementations, one or more process blocks of FIG. 5 may be performed by a first LAG device. In some implementations, one or more process blocks of FIG. 5 may be performed by another device or a group of devices separate from or including the first LAG device, such as peer device 210, ingress network device 220, a second LAG device, and/or egress network device 220.

As shown in FIG. 5, process 500 may include receiving, from an ingress network device, a packet for a protocol session associated with detecting faults in a label switched path (LSP) of a label switching network that includes a link aggregation group (LAG) (block 510). For example, a first LAG device may receive, from ingress network device 220, a packet for a protocol session (e.g., a BFD protocol session) associated with detecting faults in a LSP of a label switching network (e.g., an MPLS network) that includes a LAG.

In some implementations, the packet may be encapsulated with one or more headers (e.g., a label switching header, an IP header, a UDP header, etc.) by ingress network device 220, and ingress network device 220 may provide the encapsulated packet to the first LAG device. In this case, the UDP header may include a dynamically assigned UDP source port identifier. In some implementations, the packet may be encapsulated with one or more headers that include a first set of discriminator values associated with a sender device, a second set of discriminator values associated with a receiver device, a protocol session identifier value, a transmission interval value, a multiplier value, or some combination thereof.

In some implementations, the first LAG device may periodically receive additional packets associated with the BFD session until all of the links in the LAG are tested. In some cases, ingress network device 220 may update the dynamically assigned UDP source port identifier at an interval that is greater than (in some cases, less than) an interval used to determine packet timeout, as described further herein.

In this way, the first LAG devices receives a packet with a dynamically assigned UDP source port identifier that may be further processed to select a link in the LAG to use as a path in the LSP.

As shown in FIG. 5, process 500 may include selecting, using a dynamically assigned user datagram protocol (UDP) source port identifier, a link in the LAG to use as a path in the LSP (block 520). For example, the first LAG device use a dynamically assigned UDP source port identifier to select a link in the LAG to use as a path in the LSP.

In some implementations, the first LAG device may execute a hash algorithm to identify a link in the LAG. For example, the first LAG device may use the dynamically assigned UDP source port identifier as input for the hash algorithm. The hash algorithm may compute a hash key. The first LAG device may use the hash key to identify a link. In this case, the first LAG device may select the identified link as the link in the LAG to use as the path in the LSP.

In this way, the first LAG device selects a link in the LAG to use as a path in the LSP.

As shown in FIG. 5, process 500 may include providing, using the selected link, the packet to a second LAG device to permit the second LAG device to provide the packet to one or more downstream devices that include an egress network device (block 530). For example, the first LAG device may provide the packet to a second LAG device, which may cause the second LAG device to provide the packet to one or more downstream network devices that include egress network device 220.

In this way, the first LAG device may provide the packet to one or more downstream network devices for further processing.

As shown in FIG. 5, process 500 may include receiving, from the egress network device, an instruction to maintain the protocol session or to close the protocol session (block 540). For example, the first LAG device may receive, from egress network device 220, an instruction to maintain the protocol session or to close the protocol session. Additionally, or alternatively, the first LAG device may receive an instruction to maintain the LSP or to close the LSP.

In this way, the first LAG device may receive an instruction associated with maintaining and/or closing the LSP and/or the BFD session.

As shown in FIG. 5, process 500 may include providing the instruction to the ingress network device (block 550). For example, the first LAG device may provide the instruction to ingress network device 220, which may cause ingress network device to perform one or more actions to carry out the instruction, as described above with regard to FIG. 4.

In this way, the first LAG device may provide an instruction associated with maintaining and/or closing the LSP and/or the BFD session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
a memory; and
one or more processors to:
receive, from an ingress network device, a packet for a protocol session associated with a label switching network that includes a link aggregation group (LAG),
the packet including a dynamically assigned user datagram protocol (UDP) source port identifier, and
the LAG including a set of links;
select, using the dynamically assigned UDP source port identifier, a link in the LAG to use;
provide, using the selected link, the packet to an egress network device;
receive an instruction to maintain the protocol session or to close the protocol session based on providing the packet using the selected link; and
provide the instruction to the ingress network device.

2. The network device of claim 1, where the packet includes at least one of:
a first set of discriminator values associated with a sender device,
a second set of discriminator values associated with a receiver device,
a protocol session identifier value,
a transmission interval value,
a multiplier value, or
some combination thereof.

3. The network device of claim 1, where the protocol session is a bidirectional forwarding detection (BFD) protocol session and the label switching network is a multiprotocol label switching (MPLS) network.

4. The network device of claim 1, where the one or more processors, when selecting the link in the LAG, are to:
execute a hash algorithm to identify a link in the LAG,
the hash algorithm to use the dynamically assigned UDP source port identifier to compute a hash key, and
the hash key to be used to identify the link, and
select the identified link as the link in the LAG to use.

5. The network device of claim 1, where the dynamically assigned UDP source port identifier is updated at an interval that is greater than an interval used to determine packet timeout.

6. The network device of claim 1, where the network device periodically receives additional packets associated with the protocol session until the set of links in the LAG are tested.

7. The network device of claim 1, where the one or more processors, when providing the packet to the egress network device, are to:
provide the packet to the egress network device prior to packet timeout occurring; and where the one or more processors, when receiving the instruction to maintain the protocol session or the close the protocol session, are to:
receive an instruction to maintain the protocol session.

8. The network device of claim 1, where the one or more processors, when providing the packet to the egress network device, are to:
provide the packet to the egress network device,
the egress network device to determine that packet timeout has occurred; and
where the one or more processors, when receiving the instruction to maintain the protocol session or the close the protocol session, are to:
receive an instruction to close the protocol session.

9. A method comprising:
receiving, by a network device and from an ingress network device, a packet for a protocol session associated with a label switching network that includes a link aggregation group (LAG),
the packet including a dynamically assigned user datagram protocol (UDP) source port identifier, and
the LAG including a set of links;
selecting, by the network device, a link in the LAG to use based on the dynamically assigned UDP source port identifier;
providing, by the network device and using the selected link, the packet to an egress network device;
receiving, by the network device, an instruction to maintain the protocol session or to close the protocol session based on providing the packet using the selected link; and
providing, by the network device, the instruction to the ingress network device.

10. The method of claim 9, where the packet includes at least one of:
a first set of discriminator values associated with a sender device,
a second set of discriminator values associated with a receiver device,
a protocol session identifier value,
a transmission interval value,
a multiplier value, or
some combination thereof.

11. The method of claim 9, where the protocol session is a bidirectional forwarding detection (BFD) protocol session and the label switching network is a multiprotocol label switching (MPLS) network.

12. The method of claim 9, where selecting the link in the LAG to use includes:
executing a hash algorithm to identify a link in the LAG,
the hash algorithm to use the dynamically assigned UDP source port identifier to compute a hash key, and
the hash key to be used to identify the link, and
select the identified link as the link in the LAG to use.

13. The method of claim 9, where the dynamically assigned UDP source port identifier is updated at an interval that is greater than an interval used to determine packet timeout.

14. The method of claim 9, where the network device periodically receives additional packets associated with the protocol session until the set of links in the LAG are tested.

15. The method of claim 9, where providing the packet to the egress network device includes:
providing the packet to the egress network device prior to packet timeout occurring; and
where receiving the instruction to maintain the protocol session or the close the protocol session includes:
receiving an instruction to maintain the protocol session.

16. The method of claim 9, where providing the packet to the egress network device includes:
providing the packet to the egress network device,
the egress network device to determine that packet timeout has occurred; and
where receiving the instruction to maintain the protocol session or the close the protocol session includes:
receiving an instruction to close the protocol session.

17. A non-transitory computer-readable medium storing instructions, the instructions comprising:
one or more instructions that, when executed by one or more processors, cause the one or more processors to:
receive, from an ingress network device, a packet for a protocol session associated with a label switching network that includes a link aggregation group (LAG),
the packet including a dynamically assigned user datagram protocol (UDP) source port identifier, and
the LAG including a set of links;
select, using the dynamically assigned UDP source port identifier, a link in the LAG to use;
provide, using the selected link, the packet to an egress network device;
receive an instruction to maintain the protocol session or to close the protocol session based on providing the packet using the selected link; and
provide the instruction to the ingress network device.

18. The non-transitory computer-readable medium storing instructions of claim 17, where the packet includes at least one of:
a first set of discriminator values associated with a sender device,
a second set of discriminator values associated with a receiver device,
a protocol session identifier value,
a transmission interval value,
a multiplier value, or
some combination thereof.

19. The non-transitory computer-readable medium storing instructions of claim 17, where the protocol session is a bidirectional forwarding detection (BFD) protocol session and the label switching network is a multiprotocol label switching (MPLS) network.

20. The non-transitory computer-readable medium storing instructions of claim 17, where the dynamically assigned UDP source port identifier is updated at an interval that is greater than an interval used to determine packet timeout.

* * * * *